United States Patent [19]
Lahat

[11] Patent Number: 5,865,062
[45] Date of Patent: Feb. 2, 1999

[54] METHOD AND DEVICE FOR SPEED CONTROL OF A BICYCLE

[76] Inventor: Chaim Lahat, 953-3 Har Argaman, P.O. Box 71908, Maccabim, Israel

[21] Appl. No.: 859,783

[22] Filed: May 19, 1997

[51] Int. Cl.[6] .............................. B62K 23/02; B62M 9/12; B62M 25/04
[52] U.S. Cl. .................. 74/473.12; 74/337.5; 74/473.13; 74/473.14; 74/489; 474/81
[58] Field of Search ................... 74/337.5, 473.12, 74/473.13, 473.14, 489; 384/42; 474/81

[56] References Cited

U.S. PATENT DOCUMENTS

| | | |
|---|---|---|
| 3,813,132 | 5/1974 | Sahm ............................ 384/42 |
| 3,886,806 | 6/1975 | Nagano . |
| 3,901,095 | 8/1975 | Wechsler ......................... 474/81 |
| 3,915,029 | 10/1975 | Shimada . |
| 3,919,891 | 11/1975 | Stuhlmuller et al. . |
| 3,965,763 | 6/1976 | Wechsler ......................... 474/81 |
| 4,189,954 | 2/1980 | Nakamura et al. . |
| 4,194,408 | 3/1980 | Hedrich . |
| 4,196,643 | 4/1980 | Nagano . |
| 4,201,095 | 5/1980 | Cirami . |
| 4,223,563 | 9/1980 | Kline . |
| 4,267,742 | 5/1981 | Cabeza . |
| 4,270,402 | 6/1981 | Nagano . |
| 4,270,481 | 6/1981 | Watarai . |
| 4,279,174 | 7/1981 | Ross ........................... 74/473.14 |
| 4,319,673 | 3/1982 | Kojima . |
| 4,412,828 | 11/1983 | Darby . |
| 4,507,101 | 3/1985 | Nagano . |
| 4,530,678 | 7/1985 | Wechsler ......................... 474/81 |
| 4,605,240 | 8/1986 | Clem et al. . |
| 4,613,319 | 9/1986 | Nagano . |
| 4,699,605 | 10/1987 | Jona . |
| 5,354,243 | 10/1994 | Kriek . |
| 5,356,348 | 10/1994 | Bellio et al. ..................... 474/70 |
| 5,358,451 | 10/1994 | Lacombe et al. . |
| 5,447,475 | 9/1995 | Socard . |
| 5,577,969 | 11/1996 | Watarai . |
| 5,681,234 | 10/1997 | Ethington ....................... 474/70 |

Primary Examiner—Allan D. Herrmann
Attorney, Agent, or Firm—Mark M. Friedman

[57] ABSTRACT

A speed control method and device for a bicycle, aimed at synchronously controlling both front and rear derailleurs to achieve predetermined sequential combinations of front and rear gears of front and rear gear systems, respectively, for a gradual and smooth increase/decrease of speed of the bicycle.

7 Claims, 7 Drawing Sheets

METHOD AND DEVICE FOR SPEED CONTROL OF A BICYCLE

FIELD AND BACKGROUND OF THE INVENTION

The present invention relates in general to a method and a device for speed control of a bicycle. More particularly, the present invention relates to a method and a device for speed control of a bicycle which employ a synchronous control mechanism for bicycle front and rear derailleurs, which mechanism aimed at synchronously controlling both front and rear derailleurs to achieve predetermined sequential combinations of front and rear gears of front and rear gear systems of the bicycle, respectively, to enable a gradual and smooth increase/decrease of speed of the bicycle.

A Bicycle includes a front gear rotated via pedals by a bicyclist, the rotational movement of the front gear is transmitted via a chain to a rear gear, itself connected to the rear wheel of the bicycle. The number of rotations performed by the rear gear (and thus the rear wheel) per a single rotation of the front gear (i.e., pedals) equals the ratio, m/n, between the number of teeth (or radius) of the front gear, m, and the number of teeth (or radius) of the rear gear, n.

With reference now to FIG. 1. In order to enable more versatile and efficient riding, a speed controlled bicycle has been developed in which numerous discrete m/n ratios can be selected by the bicyclist. Thus, a speed controlled bicycle includes a front 20a and a rear 20b gear systems, at least one of the systems has at least two parallel gears each of a different radius (i.e., a different number of teeth). Typically the front gear system 20a includes two or three front gears 28a–c of different sizes and the rear gear system 20b includes five or six rear gears 22a–f of different sizes (i.e., 10, 12, 15 or 18 different gear combinations). A speed controlled bicycle further includes a front and a rear speed control devices, 24a and 24b, respectively, each includes a front derailleur 26a or a rear derailleur 26b, and derailleur operating means, 19a and 19b, respectively, to select a combination of a selected front gear and a selected rear gear to be engaged by the chain 18, to obtain a suitable and/or desired m/n ratio. Rear derailleur 26b typically includes means such as a tension pulley to maintain the chain at a predetermined range of tension (not shown).

For gear selection, each of the derailleur operating means 19a and 19b typically includes guiding means (known in the art as shifters) 21a and 21b, respectively. Each of guiding means 21a and 21b has segments 23a–c and 25a–f, respectively. Each of segments 23a–c and 25a–f has a predetermined gradually increasing or decreasing line-distance from the front 26a and rear 26b derailleurs, respectively. Thus, by separately guiding members 27a and 27b, to which members 27a and 27b connected are lines (wires, or as recently introduced to the art, hydraulic lines) 29a and 29b, themselves connected to front 26a and rear 26b derailleurs, respectively, along guiding means 21a and 21b, the locations of each of the front 26a and rear 26b derailleurs is separately and mechanically independently determined, to enable a separate selection of a specific front (28a in the example of FIG. 1) and a specific rear (22a in the example of FIG. 1) gears to be engaged by chain 18. It should be noted that prior art derailleurs operating means 24a and 24b are each mechanically independently operated by the bicyclist.

As for the simple bicycle described above, the front gear system of a speed controlled bicycle hereinabove described is forwardly rotated via pedals operated by a bicyclist, which forward rotation is transmitted onto the rear gear system by the chain, resulting in a forward rotation of the rear gear system and of the rear wheel therewith. Similarly to as described, the number of rotations performed by the rear wheel per a single rotation performed by the front gear system equals the ratio m/n, wherein m is the number of teeth (or radius) of a selected front gear engaged by the chain in the front gear system and n is the number of teeth (or radius) of a selected rear gear engaged by the chain in the rear gear system. Speed control is thus achieved by changing the m/n ratio, via mechanically independently selecting combinations of a gear of the front gear system via the front speed control device and a gear of the rear gear system via the rear speed control device.

The number of teeth in front and rear gears of a typical bicycle having three front gears (marked as 'f') in the front gear system and six rear gears (marked as 'r') in the rear gear system, and the m/n ratio for each of the eighteen combinations of front and rear gears, are given in Table 1 below.

TABLE 1

| | # of teeth | | | | | |
|---|---|---|---|---|---|---|
| | | | n | | | |
| m | r28 | r24 | r21 | r18 | r16 | r14 |
| f28 | 1.00 | 1.17 | 1.33 | 1.56 | 1.75 | 2.00 |
| f38 | 1.36 | 1.58 | 1.81 | 2.11 | 2.37 | 2.71 |
| f48 | 1.71 | 2.00 | 2.29 | 2.77 | 3.00 | 3.42 |

As shown in Table 1, the lowest speed is achieved selecting the smallest front gear, f28, and the largest rear gear, r28, wherein the m/n ratio equals 1.00. In this case, the number of rotations performed by the rear wheel per a single rotation performed by the front gear is 1.00. As further shown in Table 1, the highest speed is achieved selecting the largest front gear, f48, and the smallest rear gear, r14, wherein the m/n ratio equals 3.42. In this case, the number of rotations performed by the rear wheel per a single rotation performed by the front gear is 3.42.

Apparently a bicycle with the parameters described in Table 1, has eighteen (3×6) different speeds. For a gradual increase/decrease of speed, the bicyclist should select front and rear gear combinations with gradually increased/decreased m/n ratios, respectively.

Table 2 presents grades (1 through 18) for increasing m/n ratios as are calculated in Table 1, wherein 1 represents the lowest ratio (i.e., 1.00 in the given example) and 18 represents the highest ratio (i.e., 3.42 in the given example).

TABLE 2

| | # of teeth | | | | | |
|---|---|---|---|---|---|---|
| | | | n | | | |
| m | r28 | r24 | r21 | r18 | r16 | r14 |
| f28 | 1 | 2 | 3 | 5 | 8 | 11 |
| f38 | 4 | 6 | 9 | 12 | 14 | 15 |
| f48 | 7 | 10 | 13 | 16 | 17 | 18 |

Table 3 presents the combined number of teeth (n+m) for each of the eighteen combinations, which combined number being an indication of the tension imposed on the tension pulley, wherein the higher the combined number is, the higher the tension is and vice versa.

TABLE 3

| | # of teeth | | | | | |
|---|---|---|---|---|---|---|
| | | | n | | | |
| m | r28 | r24 | r21 | r18 | r16 | r14 |
| f28 | 56 | 52 | 49 | 46 | 44 | 42 |
| f38 | 66 | 62 | 59 | 56 | 54 | 52 |
| f48 | 76 | 72 | 69 | 66 | 64 | 62 |

From this description it is apparent that following the eighteen sequentially increasing/decreasing m/n ratios have few drawbacks as follows.

First, as best seen in Tables 1 and 2, gradually increasing/decreasing the m/n ratios involves a non linear, neither smooth increase/decrease of the ratio, wherein few (i.e., two or more) sequential combinations (e.g., from f28/r18 to f38/r24; from f28/r16 to f38/r21) have similar m/n values, some even have identical values (e.g., from f48/r24 to f28/r14), whereas other sequential combinations are characterized by big differences in their m/n ratios (e.g., from f38/r28 to f28/r18; from f38/r16 to f38/r14), resulting in a non smooth operation.

Second, as best seen in table 2, following the 1 through 18 combinations involves, in many instances, shifting a gear in both front and rear gear systems and furthermore, involves gear shifting between non-adjacent gears in the same gear system (i.e., front and/or rear). For example, shifting from combination 10 to combination 11 involves shifting from the smallest rear gear, r14, to the largest, r28, in the rear gear system and from the smallest gear, f28, to the largest gear, f48, in the front gear system. Therefore, this type of operation is impractical for both the average and professional bicyclist.

Third, as best seen in Table 3, following combinations 1 through 18 involves high changes of tension imposed on a spring being part of the tension pulley of the rear derailleur. For example while moving from combination f28/r18 to combination f38/r24, the combined number of teeth changes from 46 to 62.

And finally, since the largest front gear and the largest rear gear are positioned opposite in relation to the frame of the bicycle, typically the largest front gear is away from the frame and the largest rear gear is close to the frame, few combinations characterized by a highly diagonalized position of the chain are not recommended due to the high friction thus formed between the gears and the chain. In the given example these combinations are f48/r28, f38/r28, f28/r14 and f38/r14, underlined in Table 2.

Reviewing the data presented in Table 1 above reveals that by selecting only 10 combinations, A through J, presented in Table 4 below, overcomes all of the above listed limitations.

TABLE 4

| | # of teeth | | | | | |
|---|---|---|---|---|---|---|
| | | | n | | | |
| m | r28 | r24 | r21 | r18 | r16 | r14 |
| f28 | A | B | C | | | |
| f38 | | D | E | | | |
| f48 | | F | G | H | I | J |

Thus, following the A through J combinations have advantages: (1) it provides a gradual and smooth increase in the m/n ratio; (2) only twice the bicyclist is required to shift gears both at the front and rear gear systems, that is while moving from combination C to combination D and from combination E to combination F; (3) in all gear shifts only adjacent gears are involved; (4) the combined number of teeth ranges from 49 (combination C) to 62 (combination J) thus limiting the tension range imposed on the spring of the tension pulley of the rear derailleur, thereby prolonging its life span, and (5) it avoids chain diagonalization.

However, following the A through J combinations requires (1) calculating this root as was done hereinabove in Tables 1 through 4 (2) memorizing thus calculated root; (3) employing both a front and a rear speed control devices to be in some cases operated mechanically independently, yet as simultaneously as possible, by the bicyclist.

There is thus a widely recognized need for, and it would be highly advantageous to have, a method and a device providing a synchronous control mechanism for bicycle front and rear derailleurs, which mechanism is for synchronously controlling both the front and the rear derailleurs, to achieve predetermined sequential combinations of front and rear gears for obtaining a gradual and smooth increase/decrease of speed of a speed controlled bicycle.

SUMMARY OF THE INVENTION

According to the present invention there is provided a method and a device to control the speed of a bicycle, the method and device aimed at synchronously controlling both front and rear derailleurs to achieve predetermined sequential combinations of front and rear gears of front and rear gear systems of the bicycle, respectively.

According to further features in preferred embodiments of the invention described below, the method comprising the step of synchronously controlling the front and rear derailleurs of the bicycle to select a combination from predetermined sequential combinations of front and rear gears of the front and rear gear systems of the bicycle, respectively.

According to still further features in the described preferred embodiments the method serves for obtaining a gradual and smooth change of speed of the bicycle.

According to further features in preferred embodiments of the invention described below, the speed control device comprising (a) a front electrical derailleur; (b) a rear electrical derailleur; and (c) a single selector to synchronously control the front and the rear electrical derailleurs for selecting one of the predetermined sequential combinations of front and rear gears at a time.

According to further features in preferred embodiments of the invention described below, the speed control device comprising (a) first guiding means for guiding a first member, the guiding means having first segments, each of the first segments being a predetermined line-distance from the front derailleur, the first member being guided by the first guiding means so as to control movement imposed on a first line, the first line operating the front derailleur, the front derailleur serving to select a gear of the front gear system of the bicycle; (b) second guiding means for guiding a second member, the guiding means having second segments, each of the second segments being a predetermined line-distance from the rear derailleur, the second member being guided by the second guiding means so as to control movement imposed on a second line, the second line operating the rear derailleur, the rear derailleur is for selecting a gear of the rear gear system of the bicycle; and (c) an implement for synchronously guiding the first and second members relative to the first and second guiding means, respectively, for selecting one of the predetermined sequential combinations of front and rear gears at a time.

According to still further features in the described preferred embodiments the device serves for obtaining a gradual and smooth change of speed of the bicycle.

According to still further features in the described preferred embodiments each of the first guiding means and the second guiding means is selected from the group consisting of a guiding rail and a guiding groove.

According to still further features in the described preferred embodiments each of the first guiding means and the second guiding means has an under-cut cross section.

According to still further features in the described preferred embodiments the first guiding means and the second guiding means are both implemented side by side on a single cylindrical member.

According to still further features in the described preferred embodiments the first guiding means and the second guiding means are both implemented side by side on an outer surface of a single cylindrical member.

According to still further features in the described preferred embodiments the first guiding means and the second guiding means are both implemented side by side on an inner surface of a single cylindrical member.

According to still further features in the described preferred embodiments the first guiding means and the second guiding means are both implemented in continuation on a single cylindrical member.

According to still further features in the described preferred embodiments the implement includes (a) third means for synchronously rotating the first guiding means and the second guiding means relative to the first and the second members, respectively; and (b) fourth means for limiting movement of the first and the second members to a direction perpendicular to thus described rotation.

According to still further features in the described preferred embodiments the implement includes (a) third means for synchronously rotating the first and the second members relative to the first guiding means and the second guiding means, respectively; and (b) fourth means for limiting movement of the first and the second members to a direction perpendicular to thus described rotation.

According to still further features in the described preferred embodiments the implement includes (a) third means for synchronously translating the first guiding means and the second guiding means relative to the first and the second members, respectively; and (b) fourth means for limiting movement of the first and the second members to a direction perpendicular to thus described translation.

According to still further features in the described preferred embodiments the implement includes (a) third means for synchronously translating the first and the second members relative to the first guiding means and the second guiding means, respectively; and (b) fourth means for limiting movement of the first and the second members to a direction perpendicular to thus described translation.

According to still further features in the described preferred embodiments the first guiding means is implemented on a first cylindrical member and the second guiding means is implemented on a second cylindrical member.

According to still further features in the described preferred embodiments is the first cylindrical member and the second cylindrical member are directly connected by a gear transmission mechanism, the implement is selected from the group consisting of third means for rotating the first cylindrical member and fourth means for rotating the second cylindrical member.

According to still further features in the described preferred embodiments the first cylindrical member and the second cylindrical member are indirectly connected by a gear transmission mechanism, the mechanism includes at least one gear and the implement is a third means for rotating one of the at least one gears.

According to still further features in the described preferred embodiments the first cylindrical member and the second cylindrical member are directly connected by biasing means, the implement is selected from the group consisting of third means for rotating the first cylindrical member and fourth means for rotating the second cylindrical member.

According to still further features in the described preferred embodiments the first cylindrical member and the second cylindrical member are indirectly connected by biasing means, the and the implement includes third means for operating the biasing means.

According to still further features in the described preferred embodiments the implement includes a ratchet mechanism, the ratchet mechanism is operated by at least one lever.

According to still further features in the described preferred embodiments the implement includes at least one lever for the guidance of the first and second members relative to the first and second guiding means, respectively, each of the at least one levers is limited to discrete positions.

According to still further features in the described preferred embodiments the implement includes a scale for monitoring the guidance of the first and second members relative to the first and second guiding means, respectively.

According to still further features in the described preferred embodiments the implement includes at least one lever, each of the at least one levers, when operated, produce a clicking sound when operated by a bicyclist for the guidance of the first and second members relative to the first and second guiding means, respectively.

According to still further features in the described preferred embodiments the implement includes an electrical motor, the motor is operated by a bicyclist for actuating the implement for the guidance of the first and second members relative to the first and second guiding means, respectively.

The present invention successfully addresses the shortcomings of the presently known configurations by providing a method and a device for speed control of a bicycle aimed at synchronously controlling both front and rear derailleurs to achieve predetermined sequential combinations of front and rear gears of front and rear gear systems of the bicycle, respectively, for a gradual and smooth increase/decrease of speed. Thus, the method and device of the present invention provide a gradual and smooth increase/decrease of speed; involve a low number of gear shifts both at the front and gear systems; restricts gear shifts to adjacent gears in both the front and rear gear systems; limit the tension range imposed on the spring of a tension pulley of the rear derailleur; and, avoid chain diagonalization. Thus, the speed control method and device of the present invention provide a bicyclist with an optimal selection of front and rear gear combinations, which optimal combinations are selected by a single hand operation and does not require memorizing.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a speed control method and device for a bicycle which can be used to synchronously control a bicycle's front and rear derailleurs. Specifically, the present invention can be used to select predetermined sequential combinations of front and rear gears of front and rear gear systems, respectively, to be employed for a gradual and smooth increase/decrease (i.e., change) of speed.

Thus, the method of the present invention involves synchronously controlling the front and rear derailleurs of the bicycle to select a combination from predetermined sequential combinations of front and rear gears of the front and rear gear systems of the bicycle at a time, respectively.

The principles and operation of a speed control method and device according to the present invention may be better understood with reference to the drawings and accompanying descriptions.

Figure 2:
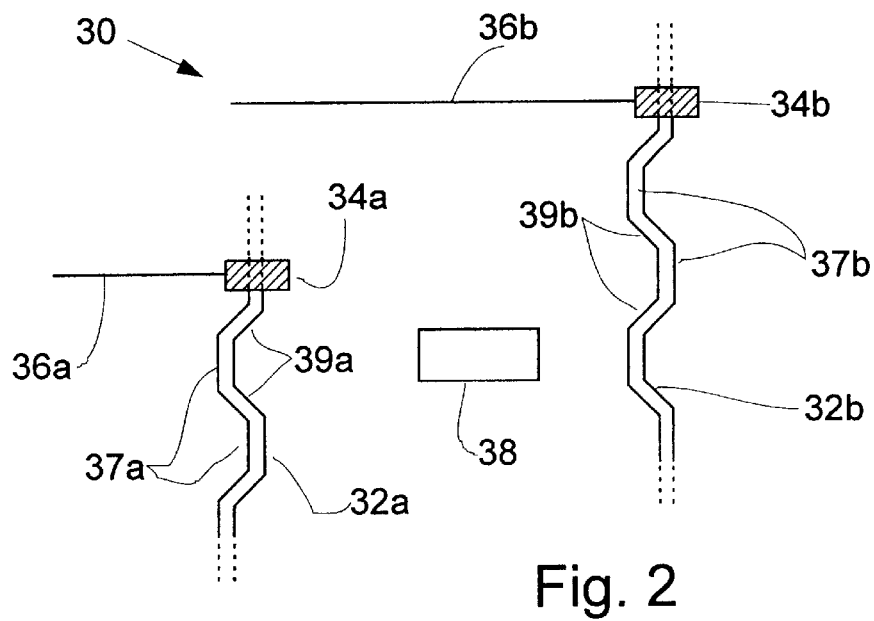
FIG. 2 is a general and schematic depiction of a speed control device for a bicycle according to the present invention.

Referring now to the drawings, FIG. 2 illustrates the principles of operation of the speed control device of the present invention, referred to herein below as device 30, which device 30 enables a synchronous control of front and rear derailleurs of a bicycle to select predetermined sequential combinations of front and rear gears of front and rear gear systems of the bicycle, respectively, to enable a gradual and smooth increase/decrease (i.e., change) of speed of the bicycle.

Generally described, device 30 includes (a) first guiding means 32a for guiding a first member 34a which controls the movement imposed on a first line (a wire or a hydraulic line) 36a connected thereto, which first line 36a operates the front derailleur used for selecting a gear of the front gear system of the bicycle; (b) second guiding means 32b for guiding a second member 34b which controls the movement imposed on a second line (a wire or a hydraulic line) 36b connected thereto, which line 36b operates the rear derailleur, the rear derailleur is for selecting a gear of the rear gear system of the bicycle; and (c) an implement 38 for synchronously guiding first 34a and second 34b members relative to first 32a and second 32b guiding means, respectively, for selecting one desired combination from predetermined sequential combinations of front and rear gears of the front and rear gear systems of the bicycle at a time.

Each of guiding means 32a and 32b includes first and second segments 37a and 37b, respectively, each of segments 37a and 37b is at a preselected line-distance from the front and rear derailleur. It is important to note that for some applications, as exemplified hereinbelow in Example 6, the preselected line distance of two or more segments 37a and 37b of means 32a and 32b, respectively, in some cases neighboring segments, may be equal. Segments 37a and 37b are arranged such that by synchronously guiding members 34a and 34b relative to guiding means 32a and 32b, to engage a specific segment 37a and 37b, respectively, a predetermined level of movement (e.g., non or more) is imposed on lines 36a and 36b, respectively, to activate the front and/or rear derailleurs to select one of the predetermined combinations of front and rear gears of the front and rear gear systems of the bicycle, respectively.

Preferably, segments 37a, like segments 37b, are connected to one another by connecting segments 39a (39b for segments 37b) forming a wide angle with segments 37a (37b) to ease the relative guidance when the line-distance characterizing neighboring segments is changed. It should be noted that the term guide and associated terms (guiding, guidance, guided etc.) as used herein and in the claims below refer to a relative guidance, that is if A is guided relative to B, thus either A is moved along B, B is moved along A, or both A and B move simultaneously not at the same speed and/or same direction.

FIG. 2 presents first 32a and second 32b guiding means each having a planar configuration. However, as will be readily appreciated by one skilled in the art and as exemplified in more detail in the Examples section hereinbelow, other configurations in which first 32a and second 32b guiding means are implemented around the outer or inner surfaces of one or two cylindrical members are also possible and are presently preferred. It should be noted that when the term cylindrical member is employed herein in this document and especially in the claims section below it also refers to a conical member, a member having an oval cross section, etc. Furthermore, as will be further appreciated by one skilled in the art, in a case where both first 32a and second 32b guiding means are implemented on a single cylindrical member or in a planar configuration they may either be arranged side by side or, alternatively, be arranged in a continues fashion such that they form an apparent single guiding means having two parts, the first part functions as first guiding means 32a, whereas the second part functions as second guiding means 32b.

Figures 3A, 3B:
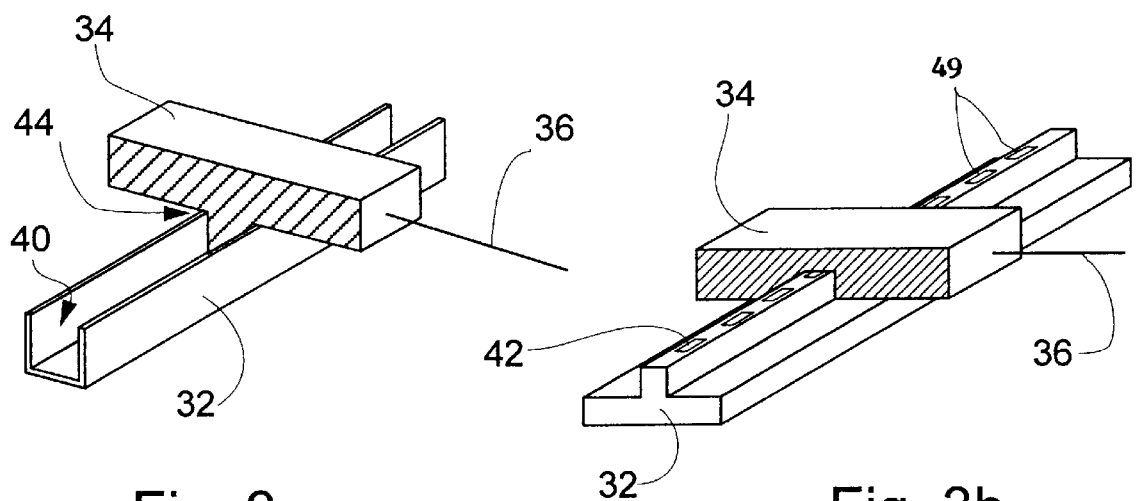
FIGS. 3a–b are perspective presentations of two embodiments of guiding means implemented in the speed control device for a bicycle according to the present invention.

As shown in FIGS. 3a–b, each of first 32a and second 32b guiding means may include a guiding groove 40 or alternatively a guiding rail 42 and the construction of members 34 is accordingly.

To smooth the relative movement between first guiding means 32a and first member 34a and, between second guiding means 32b and second member 34b, which relative movement is imposed therebetween upon synchronously guiding members 34a and 34b relative to guiding means 32a and 32b, smoothing means such as, but not limited to a lager 49 and/or oiling system 44 may be implemented between first guiding means 32a and first member 34a and between second guiding means 32b and second member 34b.

Figures 4A, 4B:
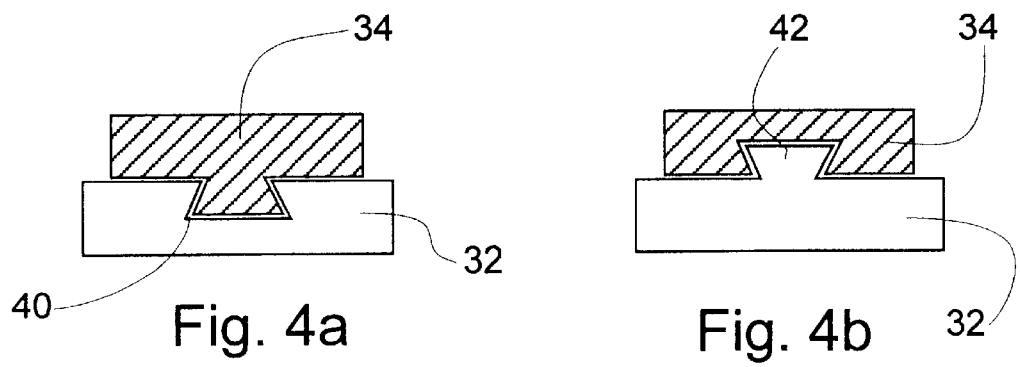
FIGS. 4a–b are cross sections through preferred configurations of the guiding means and guided members of the speed control device for a bicycle according to the present invention.

As shown in FIGS. 4a–b for both guiding groove 40 and guiding rail 42, respectively, to ensure that members 34a and 34b will not be easily pulled away from guiding means 32a and 32b, respectively, the profiles (i.e., cross sections) of members 34 and guiding means 32 are preferably selected having an under cut.

As mentioned, speed control device 30 includes implement 38 for synchronously guiding first 34a and second 34b members relative to first 32a and second 32b guiding means, respectively, for selecting one combination from the predetermined sequential combinations of front and rear gears of the front and rear gear systems of the bicycle at a time. As is clear to one ordinarily skilled in the art, synchronously guiding first 34a and second 34b members relative to first 32a and second 32b guiding means, respectively, may be achieved either by limiting the movement of first 34a and second 34b members while actively and synchronously rotating or translating first 32a and second 32b guiding means relative to first 34a and second 34b members, respectively, or alternatively by limiting the movement of the first 32a and second 32b guiding means while actively and synchronously rotating or translating first 34a and second 34b members relative to first 32a and second 32b guiding means, respectively. It should be however noted that additional options exist, in which active synchronous rotation or translation is imposed on first guiding means 32a and second member 34b or alternatively, second guiding means 32b and first member 34a, yet these options are presently less favorable.

Accordingly and preferably, implement 38 includes means for limiting the movement of first 34a and second 34b members in one direction and means for synchronously rotating or translating first 32a and second 32b guiding means relative to first 34a and second 34b members, respectively, in the perpendicular direction, or alternatively, implement 38 includes means for limiting the movement of first 32a and second 32b guiding means to one direction and means for synchronously rotating or translating first 34a and second 34b members relative to first 32a and second 32b guiding means, respectively, in the perpendicular direction.

Figure 5:
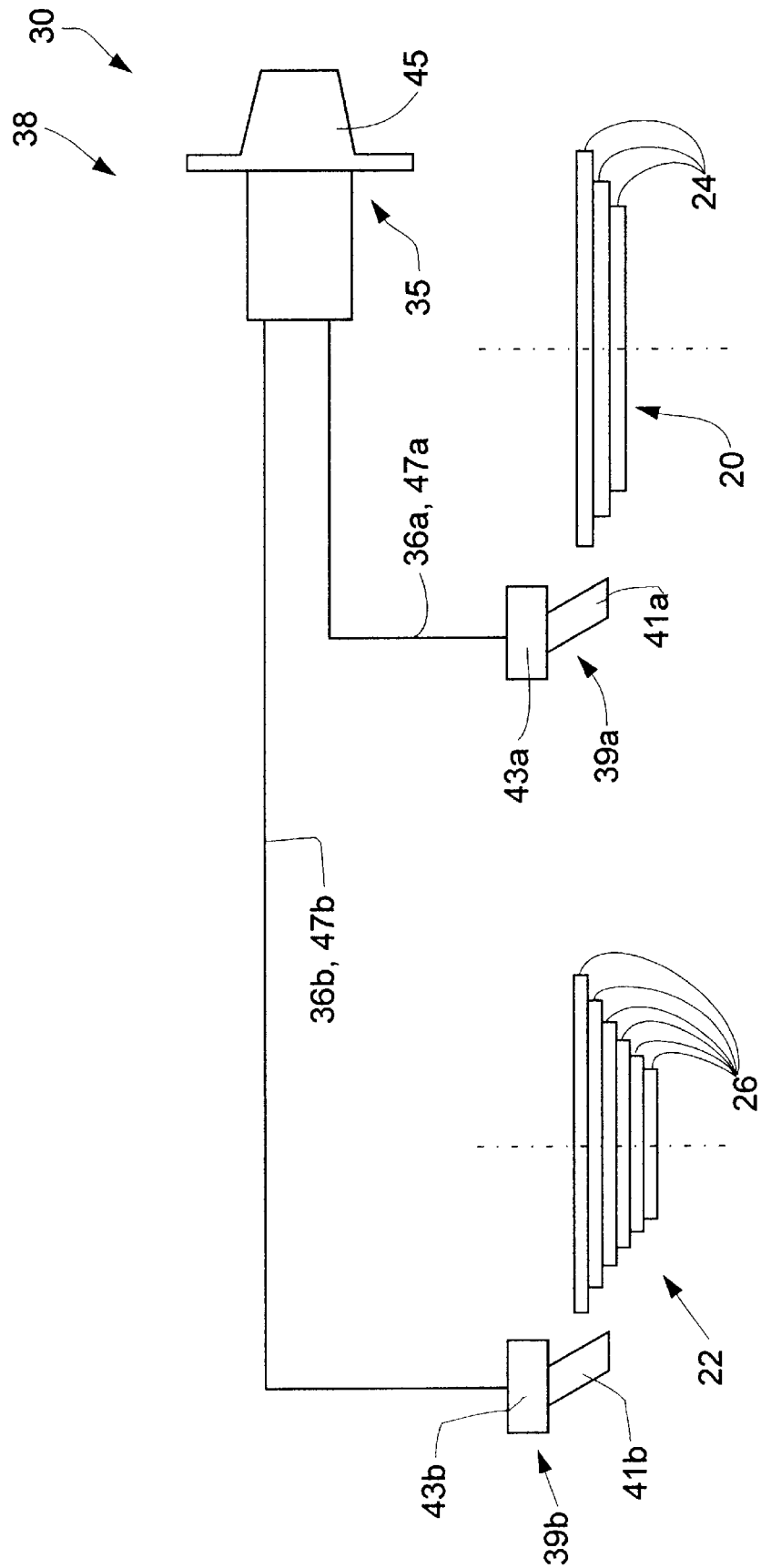
FIG. 5 is a schematic depiction of the speed control device for a bicycle according to the present invention actuated by an electrical motor or a single selector of electrical derailleurs.

With reference now to FIG. 5, it is clear to one ordinarily skilled in the art that implement 38 of speed control device 30 may include an electrical motor 35, the motor is operated by a bicyclist for actuating implement 38 for the synchronous guidance of the first and second members relative to the first and second guiding means, respectively, to which guiding means connected are first and second members, respectively, to which members connected are first 36a and second 36b lines, themselves operating front 39a and rear 39b derailleurs, respectively. Thus operating front 39a and rear 39b derailleurs is for obtaining a predetermined sequential combinations of front 24 and rear 26 gears of front 20 and rear 22 gear systems, respectively, for a gradual and smooth increase/decrease of speed.

Still referring to FIG. 5, recently, a relatively new concept of electrical gear selection was introduced to the art. According to this concept employed are front and rear electrical derailleurs, the front and rear electrical derailleurs are actuated by a front and rear electrical actuators being a part included in the electrical derailleurs, the operation of each of the electrical actuators is separately controlled by the bicyclist by suitable front and rear mechanical or electronical selectors. Combining this new concept with the present invention, that is synchronously controlling the front and rear electrical derailleurs by a single selector, to achieve predetermined sequential combinations of front and rear gears of front and rear gear systems, respectively, for a gradual and smooth increase/decrease of speed, as will be appreciated by one ordinarily skilled in the art, is within the scope of the present invention. Thus, according to this embodiment of the invention, employed are a front and a rear electrical derailleurs 41a and 41b, respectively, front 41a and rear 41b electrical derailleurs are actuated by a front and rear electrical actuators, 43a and 43b, respectively, the operation of each of the electrical actuators is synchronously controlled by the bicyclist by a suitable mechanical electrical or electronical selector 45, to synchronously control, via command lines 47a and 47b, front 41a and rear 41b electrical derailleurs, respectively, to achieve predetermined sequential combinations of front 26 and rear 24 gears of front 22 and rear 20 gear systems of the bicycle, respectively. It will be appreciated that when the term synchronously is referred to herein in the context of electrical derailleurs it also refers to substantially synchronously, wherein a time lag may characterize the operation of front 41a and rear 41b electrical derailleurs and thus the relative timing of front and rear gear change. This may be an advantage since a simultaneous front and rear gears shift is avoided.

The art of bicycle speed control devices has previously provided devices with features rendering their operation simpler and more comfortable. For example, many prior art speed control devices include scale(s) to indicate to the bicyclist which gear is presently selected in each of the front and rear gear systems. Additional features include step wise movement of levers through which these devices are operated, providing the levers with sound producing means (e.g., a tick-tack) to indicate a bicyclist of a change in gear selection, providing the levers with means for selecting the amount of friction associated with their operation (i.e., friction selector), etc. It is however clear to one ordinarily skilled in the art that these and further features making gear selection more comfortable may be included in the speed control device of the present invention.

Reference in now made to the following examples, which together with the above descriptions, illustrate the invention.

EXAMPLE 1

Figure 6:
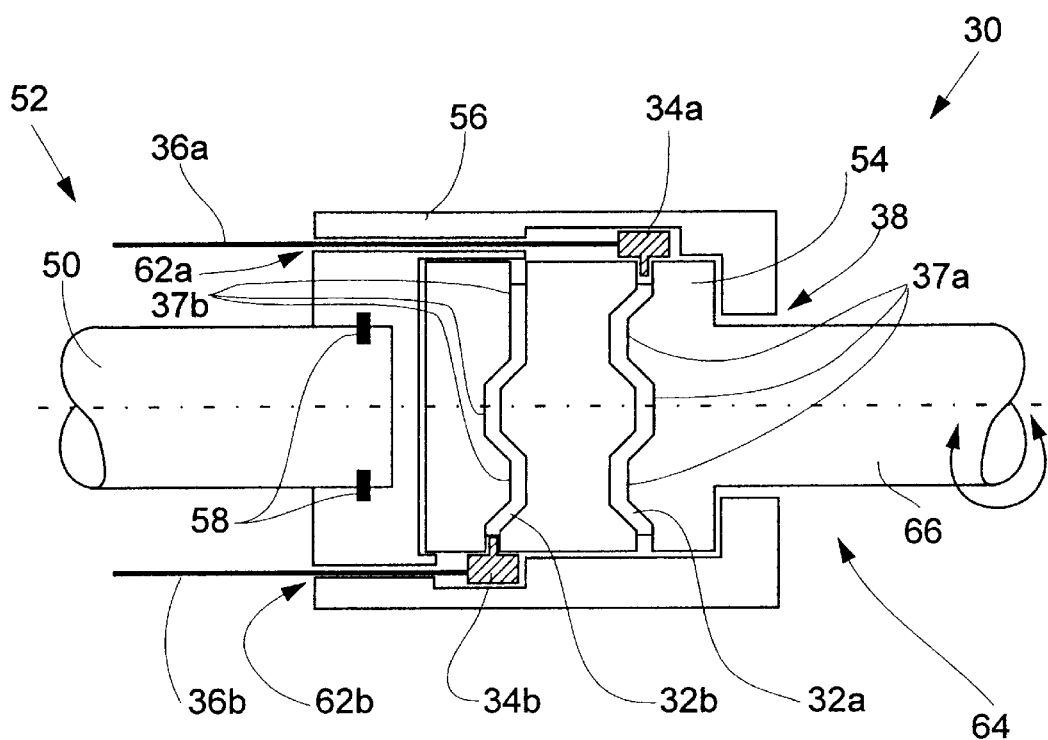
FIG. 6 is a cut through/top view of a preferred embodiment of the speed control device for a bicycle according to the present invention.

With reference now to FIG. 6, presented is a preferred embodiment of the speed control device 30 of the present invention. According to this embodiment, device 30 is implemented at the right side, as shown in FIG. 6, or left side, not shown, of handle 50 of a bicycle's handlebar 52. Further according to this embodiment, device 30 includes first 32a and second 32b guiding means in the form of guiding grooves, to which guiding means 32a and 32b connected are first 34a and second 34b members, respectively, to which members connected are first 36a and second 36b lines, themselves operating front and rear derailleurs (not shown). First 32a and second 32b guiding means, according to this embodiment, are arranged side by side around the outer surface of a single cylindrical member 54.

As mentioned above, according to any of its configurations device 30 includes implement 38 for synchronously guiding first 34a and second 34b members relative to first 32a and second 32b guiding means, respectively, for selecting one of the predetermined sequential combinations of front and rear gears of the front and rear gear systems of the bicycle. Accordingly, in this embodiment, implement 38 includes means in the form of housing 56 fixedly connected to handle 50 by, suitable means such as pins 58, housing 56 is for limiting the movement of first 34a and second 34b members relative to the direction of rotational movement of cylindrical member 54. As further shown in FIG. 6, housing 56 includes channels 62a and 62b to accommodate lines 36a and 36b, respectively. Channels 62a and 62b are possibly oiled as to minimize friction between their internal surface and lines 36a and 36b, respectively. Further accordingly, implement 38 further includes means 64 for synchronously rotating first 32a and second 32b guiding means relative to first 34a and second 34b members, respectively, means 64 is in the form of grip handle 66.

Figure 1:
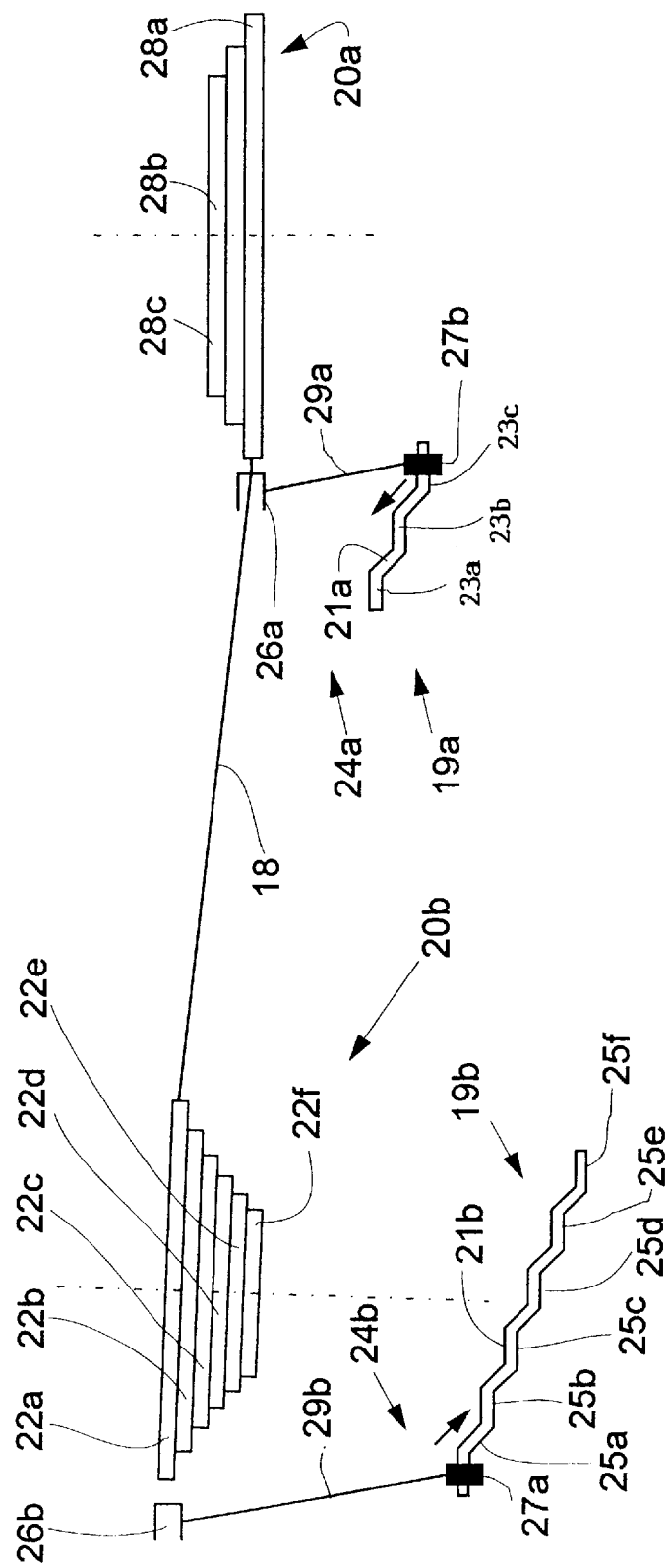
FIG. 1 is a schematic depictions of a prior art front and rear gear systems and of prior art front and rear speed control devices of a bicycle.

The operation of device 30 according to this embodiment is as follows. When a bicyclist wishes to change speed, the bicyclist rotates grip handle 66 clockwise or counterclockwise according to the specific implementation of device 30 and as instructed. As a result of thus rotating grip handle 66, cylindrical member 54, fixedly connected thereto or integrally formed with, and thus first 32a and second 32b guiding means actively rotate relative to first 34a and second 34b members, each of which, due to segments 37a and 37b therefore imposes a predetermined level of movement on lines 36a and 36b. Since, as explained above and exemplified in FIGS. 1 and 6, segments 37 are arranged such that by synchronously guiding members 34a and 34b relative to guiding means 32a and 32b, a predetermined level of movement (i.e., non or more) is imposed on lines 36a and 36b to select a predetermined combination of front and rear gears of the front and rear gear systems of the bicycle, a discrete new combination of front and rear gears and thus a new speed are obtained.

EXAMPLE 2

Figure 7:
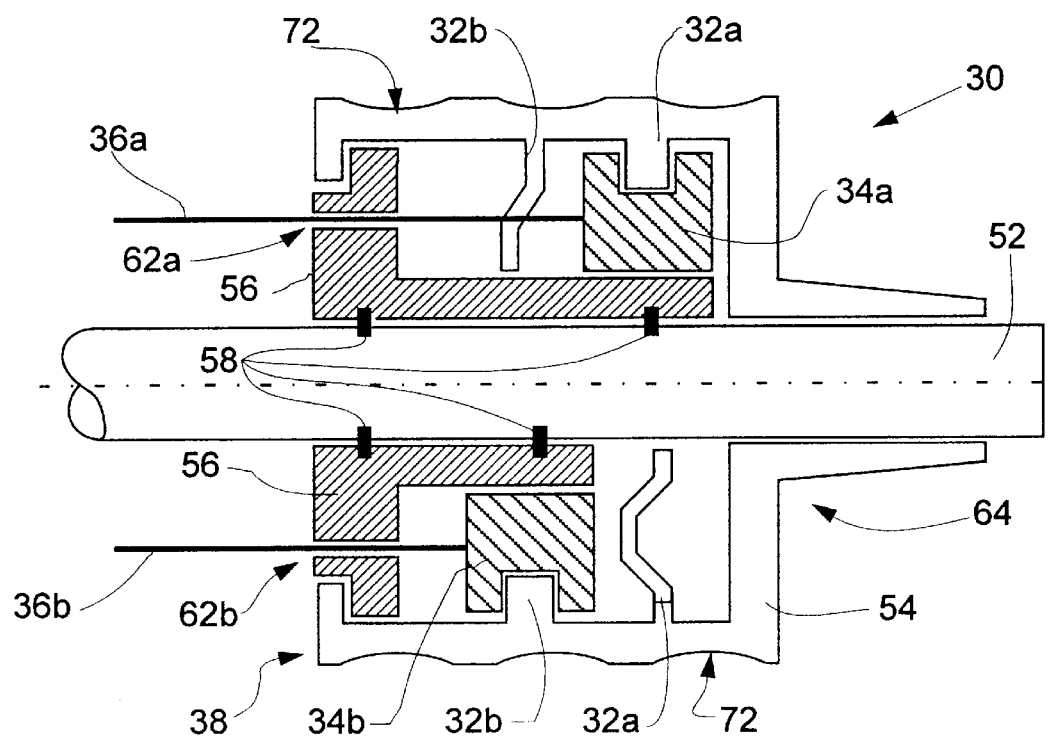
FIG. 7 is a cross section through another preferred embodiment of the speed control device for a bicycle according to the present invention.

With reference now to FIG. 7, presented is another preferred embodiment of the speed control device 30 of the present invention. According to this embodiment, device 30 is implemented anywhere along a bicycle's handlebar 52, preferably closer to one of its ends to be within reach by a hand of a bicyclist. Further according to this embodiment device 30 includes first 32a and second 32b guiding means in the form of guiding rails, to which guiding means 32a and 32b connected are first 34a and second 34b members, respectively, to which members connected are first 36a and second 36b lines, themselves operating front and rear derailleurs (not shown), respectively. First 32a and second 32b guiding means, according to this embodiment, are arranged side by side around the inner surface of a single cylindrical member 54.

As mentioned above, according to any of its configurations device 30 includes implement 38 for synchronously guiding first 34a and second 34b members relative to first 32a and second 32b guiding means, respectively, for selecting one of the predetermined sequential combinations of front and rear gears of the front and rear gear systems. Accordingly, in this embodiment, implement 38 includes means in the form of housing 56 fixedly connected to handlebar 52 by, suitable means such as pins 58, housing 56 is for limiting the movement of first 34a and second 34b members relative to the direction of rotational movement of cylindrical member 54. As further sown in FIG. 7, housing 56 includes channels 62a and 62b to accommodate lines 36a and 36b, respectively. Channels 62a and 62b are possibly oiled as to minimize friction between their internal surface and lines 36a and 36b, respectively. Further accordingly, implement 38 further includes means 64 for synchronously rotating first 32a and second 32b guiding means relative to first 34a and second 34b members, respectively, means 64 is in the form of a griping surface 72 formed on the outer side of cylindrical member 54.

The operation of device 30 according to this embodiment is as follows. When a bicyclist wishes to change speed, the bicyclist rotates cylindrical member 54 clockwise or counterclockwise according to the specific implementation of device 30 and as instructed. As a result of thus rotating cylindrical member 54, first 32a and second 32b guiding means implemented thereat rotate relative to first 34a and second 34b members, each of which, due to segments 37a and 37b, therefore imposes a predetermined level of movement (non or more) on lines 36a and 36b. Since, as explained above and exemplified in FIGS. 2 and 6, segments 37 are arranged such that by synchronously guiding members 34a and 34b relative to guiding means 32a and 32b a predetermined level of movement (non or more) is imposed on lines 36a and 36b to select a predetermined combination of front and rear gears of the front and rear gear systems of the bicycle, a discrete new combination of front and rear gears and thus a new speed are obtained.

EXAMPLE 3

Figure 8:
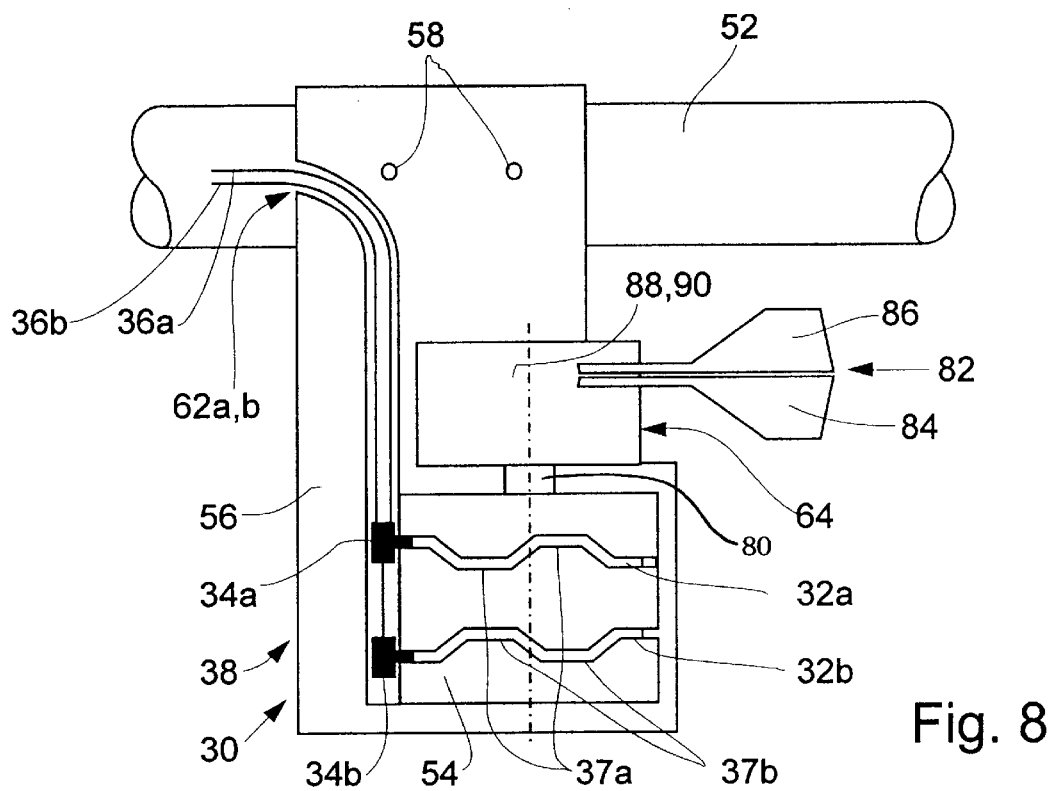
FIG. 8 is a side view/cut through yet another preferred embodiment of the speed control device for a bicycle according to the present invention.

With reference now to FIG. 8, presented is yet another preferred embodiment of the speed control device 30 of the present invention. According to this embodiment, device 30 is implemented anywhere along handlebar 52, preferably closer to one of its ends (i.e., handles), to be within reach by the hands lo of a bicyclist, or any other bar of the frame of the bicycle which is within reach by the hands of the bicyclist. Further according to this embodiment, device 30 includes first 32a and second 32b guiding means in the form of guiding grooves, to which guiding means 32a and 32b connected are first 34a and second 34b members, respectively, to which members connected are first 36a and second 36b lines, themselves operating front and rear derailleurs (not shown), respectively. As further shown in FIG. 8, lines 36a and 36b may be partly located within bar 52. First 32a and second 32b guiding means, according to this embodiment, are arranged side by side around the outer surface of a single cylindrical member 54.

As mentioned above, according to any of its configurations device 30 includes implement 38 for synchronously guiding first 34a and second 34b members relative to first 32a and second 32b guiding means, respectively, for selecting one of the predetermined sequential combinations of front and rear gears of the front and rear gear systems of the bicycle at a time. Accordingly, in this embodiment, implement 38 includes means in the form of housing 56 fixedly connected to handlebar 52 by, suitable means such as pins 58, housing 56 is for limiting the movement of first 34a and second 34b members relative to the direction of rotational movement of cylindrical member 54. As further sown in FIG. 8, housing 56 includes channels 62a and 62b to accommodate lines 36a and 36b respectively. Channels 62a and 62b are preferably oiled as to minimize friction between their internal surface and lines 36a and 36b, respectively. Further accordingly, implement 38 further includes means 64 for synchronously rotating first 32a and second 32b guiding means relative to first 34a and second 34b members, respectively. According to this embodiment of device 30, means 64 includes a shaft 80 connected to or integrally formed with cylindrical member 54. Shaft 80 is rotatable clockwise and counterclockwise. Few alternative mechanisms may be employed for rotating shaft 80. According to a first mechanism a single lever 82, directly connected to or integrally formed with shaft 80 is used to rotate shaft 80 both clockwise and counterclockwise. According to a second mechanism a first lever 84, directly connected to shaft 80 is used to rotate shaft 80 clockwise and, a second lever 86, directly connected to shaft 80 is used to rotate shaft 80 counterclockwise. According to a third mechanism first lever 84, is indirectly connected to shaft 80 via a first ratchet mechanism 88 enabling the return of first lever 84 to its basal position after rotating shaft 80 clockwise and, second lever 86, is indirectly connected to shaft 80 via a second ratchet mechanism 90 enabling the return of second lever 86 to its basal position after rotating shaft 80 counterclockwise.

The operation of device 30 according to this embodiment is as follows. When a bicyclist wishes to change speed, the bicyclist rotates cylindrical member 54 clockwise or counterclockwise using single lever 82 or either first 84 or second 86 levers, respectively. As a result of thus rotating cylindrical member 54, first 32a and second 32b guiding means implemented thereat rotate relative to first 34a and second 34b members, each of which, due to segments 37a and 37b, therefore imposes a predetermined level of movement (non or more) on lines 36a and 36b. Since, as explained above and exemplified in FIGS. 2, 6 and 8, segments 37a and 37b are arranged such that by synchronously guiding members 34a and 34b relative to guiding means 32a and 32b a predetermined level of movement is imposed on lines 36a and 36b to select a predetermined combination of front and rear gears of the front and rear gear systems of the bicycle, a discrete new combination of front and rear gears and thus a new speed are obtained.

EXAMPLE 4

Figure 9A:
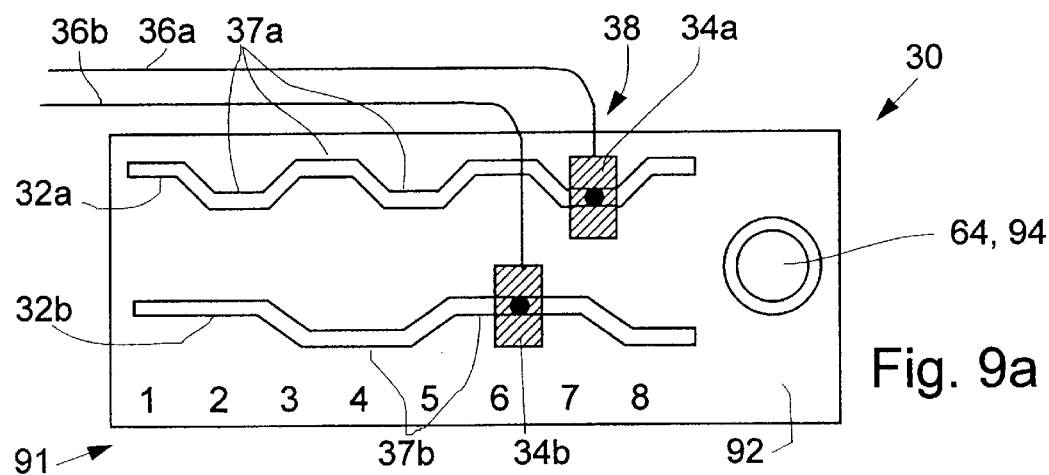
FIGS. 9a–b are a top view and a cut through still another preferred embodiment of the speed control device for a bicycle according to the present invention, respectively.
Figure 9B:
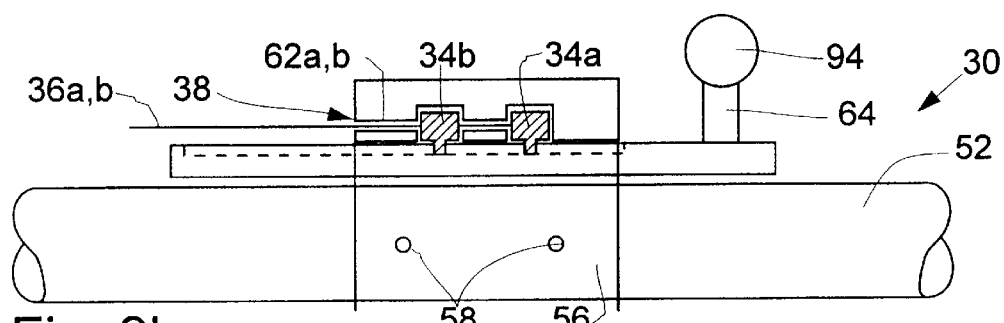

With reference now to FIGS. 9a–b, presented is still another preferred embodiment of the speed control device 30 of the present invention. According to this embodiment, device 30 is implemented anywhere along handlebar 52, preferably closer to one of its ends (i.e., handles), to be within reach by the hands of a bicyclist, or preferably any other bar of the frame of the bicycle which is within reach by the hands of the bicyclist. Further according to this embodiment device 30 includes first 32a and second 32b guiding means in the form of either guiding grooves or guiding rails, to which guiding means 32a and 32b connected are first 34a and second 34b members, respectively, to which members connected are first 36a and second 36b lines, themselves operating front and rear derailleurs (not shown), respectively. First 32a and second 32b guiding means, according to this embodiment, are arranged side by side in a planar fashion on a translatable platform 92.

As mentioned above, according to any of its configurations device 30 includes implement 38 for synchronously guiding first 34a and second 34b members relative to first 32a and second 32b guiding means, respectively, for selecting one of the predetermined sequential combinations of front and rear gears of the front and rear gear systems. Accordingly, in this embodiment, implement 38 includes means in the form of housing 56 fixedly connected to handlebar 52 by, suitable means such as pins 58, housing 56 is for limiting the movement of first 34a and second 34b members relative to the direction of translational movement of translatable platform 92. As further shown in FIGS. 9a–b, housing 56 includes channels 62a and 62b to accommodate lines 36a and 36b, respectively. Channels 62a and 62b are preferably oiled as to minimize friction between their internal surface and lines 36a and 36b, respectively. Further accordingly, implement 38 further includes means 64 for synchronously translating first 32a and second 32b guiding means relative to said first 34a and second 34b members, respectively. According to this embodiment of device 30, means 64 includes a translating handle 94 connected to or integrally formed with translatable platform 92.

As further shown in FIG. 9a, device 30 preferably includes a scale 91 to indicate a bicyclist of the speed presently selected.

The operation of device 30 according to this embodiment is as follows. When a bicyclist wishes to change speed, the bicyclist translates translatable platform 92 forwards or backwards using translating handle 94. As a result of thus translating translatable platform 92, first 32a and second 32b guiding means implemented thereat translate relative to first 34a and second 34b members, each of which, due to segments 37a and 37b, therefore imposes a predetermined level of movement (non or more) on lines 36a and 36b. Since, as explained above and exemplified in FIGS. 1, 6, 8 and 9, segments 37a and 37b are arranged such that by synchronously guiding members 34a and 34b relative to guiding means 32a and 32b a predetermined level of movement is imposed on lines 36a and 36b to select a predetermined combination of front and rear gears of the front and rear gear systems of the bicycle, a discrete new combination of front and rear gears and thus a new speed are obtained.

EXAMPLE 5

Figure 10A:
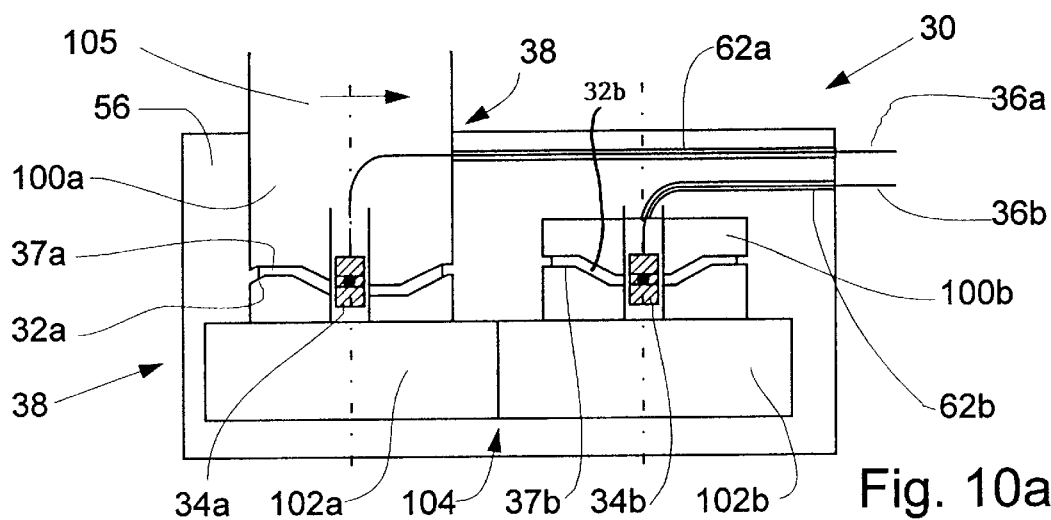
FIGS. 10a–b are a side view and a top view of still another preferred embodiment of the speed control device for a bicycle according to the present invention, respectively.
Figure 10B:
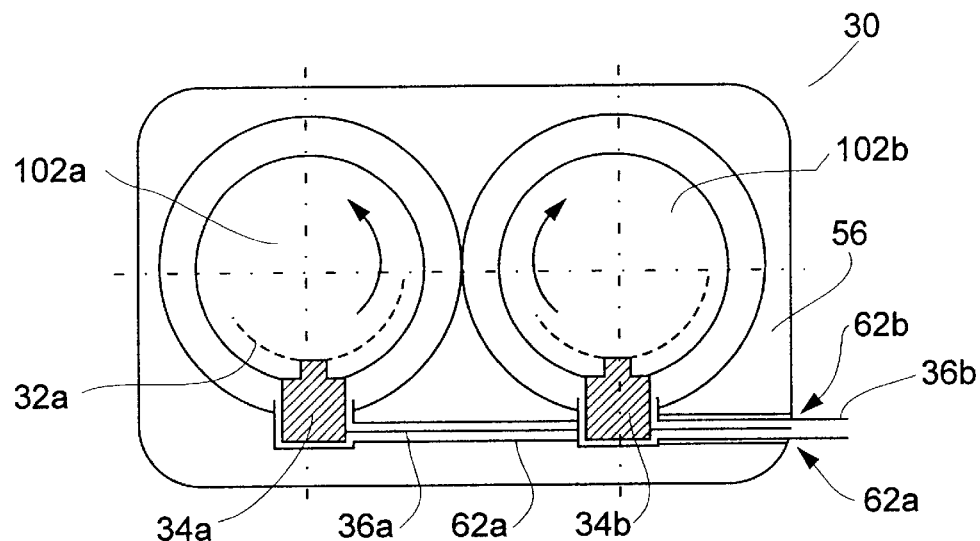

With reference now to FIGS. 10a–b, presented is a further preferred embodiment of the speed control device 30 of the present invention. According to this embodiment, device 30 is implemented anywhere along the handlebar of the bicycle, preferably closer to one of its ends (i.e., handles), to be within reach by the hands of a bicyclist, or any other bar of the frame of the bicycle which is within reach by the hands of the bicyclist. Further according to this embodiment device 30 includes first 32a and second 32b guiding means in the form of either guiding grooves or guiding rails, to which guiding means 32a and 32b connected are first 34a and second 34b members, respectively, to which members connected are first 36a and second 36b lines, themselves operating front and rear derailleurs (not shown), respectively. First guiding means 32a is implemented on the outer surface of a first cylindrical member 100a equipped with a first gear 102a, whereas second guiding means 32b is implemented on the outer surface of a second cylindrical member 100b equipped with a second gear 102b, first 102a and second 102b gears are connected (either directly, by a chain or by an additional gear) to form a gear transmission mechanism 104.

As mentioned above, according to any of its configurations device 30 includes implement 38 for synchronously guiding first 34a and second 34b members relative to first 32a and second 32b guiding means, respectively, for selecting one of the predetermined sequential combinations of front and rear gears of the front and rear gear systems. Accordingly, in this embodiment, implement 38 includes means in the form of housing 56 fixedly connected to the handlebar by suitable means, which housing 56 engages first 34a and second 34b members. As further sown in FIGS. 10a–b, housing 56 includes channels 62a and 62b to accommodate lines 36a and 36b respectively. Channels 62a and 62b are preferably oiled as to minimize friction between their internal surface and lines 36a and 36b, respectively.

Further accordingly, implement 38 further includes means 64 for synchronously translating first 32a and second 32b guiding means relative to said first 34a and second 34b members, respectively. According to this embodiment of device 30, means 64 includes a rotating handle 105 connected to or integrally formed with first 100a (as exemplified in FIGS. 10a–b) or second 100b (not shown) cylindrical members.

The operation of device 30 according to this embodiment is as follows. When a bicyclist wishes to change speed, the bicyclist rotates handle 105, and thus first cylindrical member 100a connected thereto, clockwise or counterclockwise according to the specific implementation of device 30 and as instructed. As a result of thus rotating first cylindrical member and, due to gear transmission mechanism 104, second cylindrical member 100b rotates therewith, thus, first 32a and second 32b guiding means implemented thereat rotate relative to first 34a and second 34b members, each of which, due to segments 37a and 37b, therefore imposes a predetermined level of movement (non or more) on lines 36a and 36b. Since, as explained above, segments 37a and 37b are arranged such that by synchronously guiding members 34a and 34b relative to guiding means 32a and 32b a predetermined level of movement is imposed on lines 36a and 36b to select a predetermined combination of front and rear gears of the front and rear gear systems of the bicycle, a discrete new combination of front and rear gears and thus a new speed are obtained.

Figure 11:
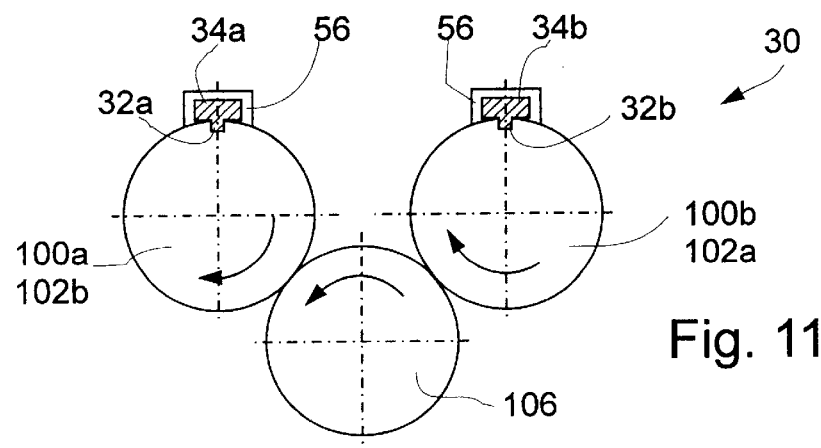
FIG. 11 is a top view of still another preferred embodiment of the speed control device for a bicycle according to the present invention.

As sown in FIG. 11, a similar gear transmission now including at least one additional gear 106 may be used to obtain similar results. Yet it is clear to one ordinarily skilled in the art that gear transmission may be replaced with biasing means aimed at friction based transmission of rotational movement such as a belt transmission mechanism (not shown) to still obtain similar results.

EXAMPLE 6

Figure 12:
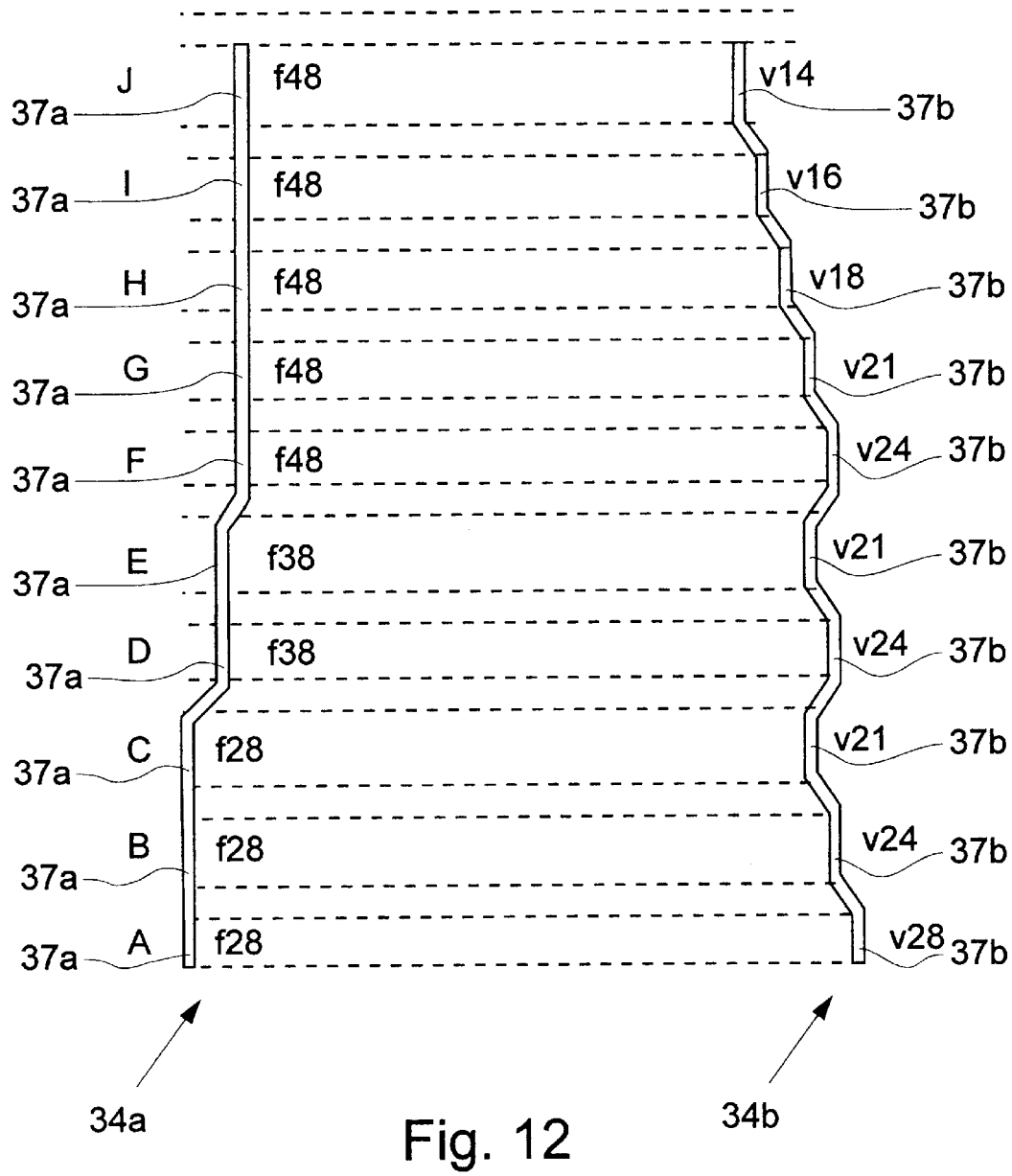
FIG. 12 is a schematic depiction of a front and a rear guiding means, according to the present invention, arranged side by side, enabling to follow the A through J predetermined sequential combinations of Table 4 above.

With reference now to FIG. 12, presented are front 34a and rear 34b guiding means arranged side by side, enabling to follow the A through J predetermined sequential combinations of Table 4 above. Note that each of segments 37a and segments 37b is at a preselected line-distance from the front and rear derailleur. Segments 37a and 37b are arranged such that by synchronously guiding first and second members relative to guiding means 32a and 32b, to engage a specific segment 37a and 37b, respectively, a predetermined level of movement (i.e., including no movement) is imposed on the first and second lines, respectively, to activate the front and rear derailleurs to select one of the predetermined sequential combinations (A through J in the example given in FIG. 12 and Table 4) of front and rear gears of the front and rear gear systems of the bicycle, respectively.

According to all of the above examples and embodiments, the speed control method and device of the present invention enjoy several advantages over the prior art, in which each of the front and rear gears employed is separately and mechanically independently selected by the bicyclist, as follows. The speed control method and device of the present invention provide a gradual and smooth increase/decrease of speed; involve a low number of gear shifts both at the front and gear systems; restrict gear shifts to adjacent gears in both the front and rear gear systems; limit the tension range imposed on the spring of a tension pulley of the rear derailleur; and, avoid chain diagonalization. Thus, the speed control method and device of the present invention provide a bicyclist with an optimal selection of front and rear gear combinations, which optimal combinations are selected by a single hand operation and does not require memorizing.

While the invention has been described with respect to a limited number of embodiments, it will be appreciated that many variations, modifications and other applications of the invention may be made.

What is claimed is:

1. A speed control device for a bicycle, for synchronous control of front and rear derailleurs to select from predetermined sequential combinations of front and rear gears of front and rear gear systems, respectively, the device comprising:

(a) first guiding means for guiding a first member, said guiding means having first segments, each of said first segments being a predetermined line-distance from the front derailleur, said first member being guided by said first guiding means so as to control movement imposed on a first line, said first line operating the front derailleur, the front derailleur serving to select a gear of the front gear system of the bicycle;

(b) second guiding means for guiding a second member, said second guiding means having second segments, each of said second segments being a predetermined line-distance from the rear derailleur, said second member being guided by said second guiding means so as to control movement imposed on a second line, said second line operating the rear derailleur, the rear derailleur is for selecting a gear of the rear gear system of the bicycle, said first guiding means and said second guiding means being both implemented on a single cylindrical member; and (c) an implement for synchronously guiding said first and second members relative to said first and second guiding means, respectively, for selecting one of the predetermined sequential combinations of front and rear gears at a time;

wherein said first guiding means and said second guiding means are both implemented side by side on an inner surface of said single cylindrical member.

2. A speed control device as in claim 1, wherein said implement includes:

(a) third means for synchronously rotating said first guiding means and said second guiding means relative to said first and said second members, respectively; and (b) fourth means for limiting movement of said first and said second members to a direction perpendicular to said rotation.

3. A speed control device as in claim 1, wherein said implement includes:

(a) third means for synchronously translating said first guiding means and said second guiding means relative to said first and said second members, respectively; and (b) fourth means for limiting movement of said first and said second members to a direction perpendicular to said translation.

4. A speed control device as in claim 1, wherein said implement includes:

(a) third means for synchronously translating said first and said second members relative to said first guiding means and said second guiding means, respectively; and (b) fourth means for limiting movement of said first and said second members to a direction perpendicular to said translation.

5. A speed control device as in claim 1, wherein said implement includes a scale for monitoring said guidance of said first and second members relative to said first and second guiding means, respectively.

6. A speed control device for a bicycle, for synchronous control of front and rear derailleurs to select from predetermined sequential combinations of front and rear gears of front and rear gear systems, respectively, the device comprising:

(a) first guiding means for guiding a first member, said guiding means having first segments, each of said first segments being a predetermined line-distance from the front derailleur, said first member being guided by said first guiding means so as to control movement imposed on a first line, said first line operating the front derailleur, the front derailleur serving to select a gear of the front gear system of the bicycle, said first guiding means being implemented on a first cylindrical member;

(b) second guiding means for guiding a second member, said second guiding means having second segments, each of said second segments being a predetermined line-distance from the rear derailleur, said second member being guided by said second guiding means so as to control movement imposed on a second line, said second line operating the rear derailleur, the rear derailleur is for selecting a gear of the rear gear system of the bicycle, said second guiding means being implemented on a second cylindrical member; and (c) an implement for synchronously guiding said first and second members relative to said first and second guiding means, respectively, for selecting one of the predetermined sequential combinations of front and rear gears at a time; and wherein, said first cylindrical member and said second cylindrical member are directly connected by a gear transmission mechanism, said implement is selected from the group consisting of third means for rotating said first cylindrical member and fourth means for rotating said second cylindrical member.

7. A speed control device for a bicycle, for synchronous control of front and rear derailleurs to select from predetermined sequential combinations of front and rear gears of front and rear gear systems, respectively, the device comprising:

(a) first guiding means for guiding a first member, said guiding means having first segments, each of said first segments being a predetermined line-distance from the front derailleur, said first member being guided by said first guiding means so as to control movement imposed on a first line, said first line operating the front derailleur, the front derailleur serving to select a gear of the front gear system of the bicycle, said first guiding means being implemented on a first cylindrical member;

(b) second guiding means for guiding a second member, said second guiding means having second segments, each of said second segments being a predetermined line-distance from the rear derailleur, said second member being guided by said second guiding means so as to control movement imposed on a second line, said second line operating the rear derailleur, the rear derailleur is for selecting a gear of the rear gear system of the bicycle, said second guiding means being implemented on a second cylindrical member; and (c) an implement for synchronously guiding said first and second members relative to said first and second guiding means, respectively, for selecting one of the predetermined sequential combinations of front and rear gears at a time; and wherein said first cylindrical member and said second cylindrical member are indirectly connected by a gear transmission mechanism, said mechanism includes at least one gear and said implement is a third means for rotating one of said at least one gear.

* * * * *